UNITED STATES PATENT OFFICE.

VALENTIN KOCH, OF GENEVA, SWITZERLAND.

INHALING APPARATUS.

SPECIFICATION forming part of Letters Patent No. 608,873, dated August 9, 1898.

Application filed December 24, 1897. Serial No. 663,392. (No model.) Patented in Switzerland March 20, 1897, No. 14,043, and in Austria September 26, 1897, No. 47/3,625.

*To all whom it may concern:*

Be it known that I, VALENTIN KOCH, tinman, residing at Geneva, Switzerland, have invented certain new and useful Improvements in Inhaling Apparatus, (for which Letters Patent were granted to me in Switzerland, No. 14,043, dated March 20, 1897, and in Austria, No. 47/3,625, dated September 26, 1897,) of which the following is a specification.

This invention relates to improvements in inhaling apparatus adapted for the inhalation of medicinal gases; and the object of the invention is to provide means for thoroughly impregnating the inhaled vapor with the desired medicament and means for cooling the vapor to the temperature most beneficial for treatment.

The invention consists of an inhaling apparatus comprising a suitable generating vessel, a perforated false bottom in said vessel, a jacketed cooling-chamber attached to the upper part of said vessel, and an inhaling-tube attached to said cooling-chamber; and the invention consists, further, in a medicine-tube of special construction for attachment to said cooling-chamber and inhaling-tube and in a mouthpiece and valve-box attached to said inhaling-tube, and, further, in certain details of construction and combinations of parts to be fully described hereinafter, and finally pointed out in the claims.

Figure 1:
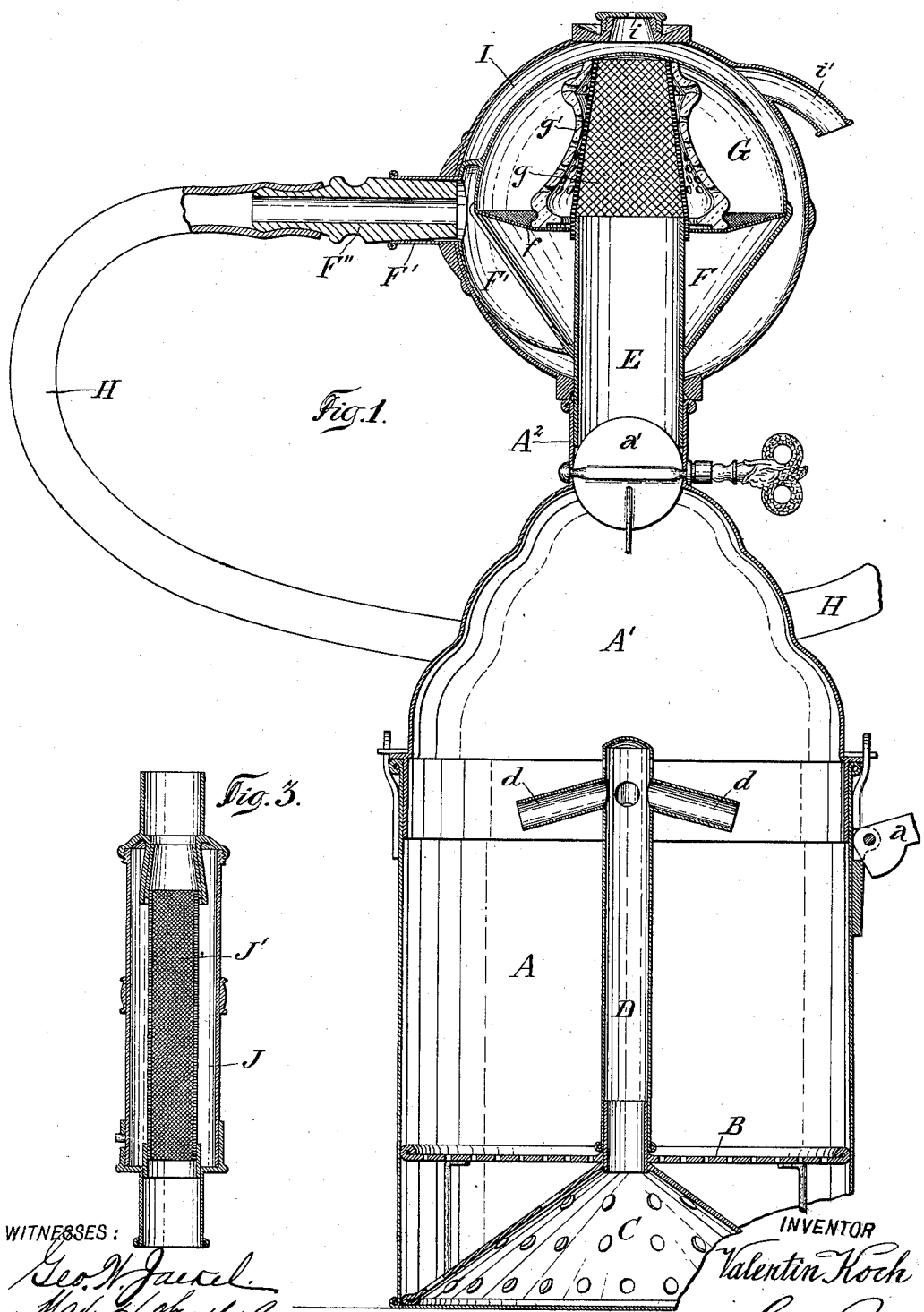
Figure 2:
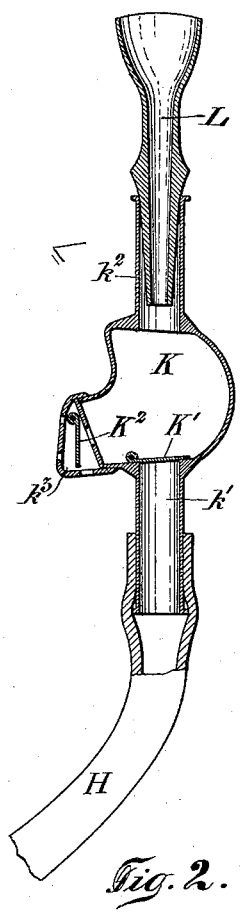

In the accompanying drawings, Figure 1 is a vertical central section of my improved inhaling apparatus. Fig. 2 is a longitudinal section of the valve-box and mouthpiece, and Fig. 3 is a longitudinal section of the medicine-tube.

Similar letters of reference indicate corresponding parts.

The apparatus is intended to be placed over a suitable source of heat, as a gas-jet or alcohol-lamp. (Not illustrated in the figures.)

Referring to the drawings, A represents a suitable generating vessel, on the bottom of which is arranged a perforated cone C and above the same a perforated false bottom B. From the perforated cone C extends a vertical tube D. The herb-leaves or other medicament which is to constitute, with the steam, the vapor to be inhaled is placed on the false bottom B. The vessel A is filled with water up to the false bottom and the cone C conducts the steam generated in the vessel into the vertical tube D as the level of the water is gradually lowered by boiling. The tube D is provided near its upper end with a number of discharge-tubes $d$, projecting in downward direction and through which the boiling water which may rise in the tube, together with the steam, is discharged on the leaves or other medicament placed on the false bottom.

The vessel A is provided with a handle $a$ and a removable cover A', which fits tightly on the vessel. The cover A' is provided in its neck $A^2$ with a valve $a'$, having an exterior handle by which the valve may be opened or closed and the quantity of vapor escaping from the vessel controlled.

The cooling-chamber consists of a tubular portion E, adapted at its lower end to fit within the neck $A^2$ of the cover A' and entering at its upper end a cone F, provided with a hemispherical cap G, extending over the upper end of the tubular portion E. Within the cooling-chamber thus formed are arranged the screens $f$ $g$ and the perforated porcelain cap $g'$. An opening in the cone permits the passage of the vapor from the same through an extension F', to which the flexible inhaling-tube H is attached by means of the connection F''. A spherical jacket I is supported on the tubular portion E and incloses the cooling-chamber. The jacket I is provided with a capped opening $i$, through which cold water may be introduced between the jacket and cooling-chamber. An outlet $i'$ provides for the escape of steam, should any be formed, and for pouring off the cooling liquid when it may be necessary to renew the same. The screens and cap $f$ $g$ $g'$ are cooled by the absorption of their heat by the cooling liquid, and the vapor passing through them, being thereby finely divided and subjected to a large cooling-surface, is quickly and effectively cooled.

The operation of the apparatus will be sufficiently understood from the foregoing description. If it is desired to further impart to the vapor medicinal properties, the medicine-tube (shown in Fig. 3) may be inserted between the extension F' of the cooling-chamber and the connection F'' of the tube H. This medicine-tube consists of an exterior tube J, in which is arranged an interior tubular screen J'. If in solid form, the medicament may be placed loosely in the tube J. If a liquid, a sponge or loose cotton may be saturated with the same and this placed in the tube J. A passage is thus provided for the vapor in the tube J', the medicament being gradually absorbed through the screen by the passing vapor.

To the end of the inhaling-tube H is secured by a nipple $k'$ a valve-box K, which is provided with a second nipple $k^2$ at its opposite end. A removable mouthpiece L is inserted in the nipple $k^2$. A check-valve K' prevents the exhaled air from passing back through the apparatus, and an outwardly-opening valve $K^2$ permits its escape into the atmosphere. The perforated casing $k^3$ of the valve-box K serves as a guard for the valve $K^2$.

The mouthpiece L may be made in various shapes, according as it is to be put in the mouth, against the mouth, or in the nostrils. In the latter case it will be branched accordingly.

Having thus described my invention, I claim as new and desire to secure by Letters Patent—

1. An inhaling apparatus, consisting of a suitable generating vessel, a perforated false bottom in said vessel, a jacketed cooling-chamber attached to the upper part of said vessel, and an inhaling-tube attached to said cooling-chamber, substantially as set forth.

2. An inhaling apparatus, consisting of a suitable generating vessel, a perforated cone located in the lower portion of said vessel, a vertical tube extending upwardly from said cone, discharge-tubes at the upper end of said vertical tube for discharging the steam within said vessel, a perforated false bottom above said cone, a jacketed cooling-chamber, and an inhaling-tube connected with said chamber, substantially as set forth.

3. An inhaling apparatus, consisting of a suitable generating vessel, a cooling-chamber attached to said vessel, an inhaling-tube connected at one end to said cooling-chamber, and a valve-box and mouthpiece at the opposite end of said inhaling-tube, said valve-box being provided with a nipple for attachment to said inhaling-tube, an interior check-valve closing the mouth of said nipple, an opening in the upper part of said valve-box and an exterior, outwardly-opening valve closing said opening, and a perforated guard-casing inclosing said valve, substantially as set forth.

4. In an inhaling apparatus, a jacketed cooling-chamber consisting of a tubular portion or neck, a cooling-chamber, screens within said cooling-chamber at the end of said tubular portion, a spherical jacket inclosing said cooling-chamber, and means for connecting said cooling-chamber with an inhaling-tube, substantially as set forth.

In testimony whereof I have signed my name to this specification in the presence of two subscribing witnesses.

VALENTIN KOCH.

Witnesses:
E. IMER-SCHNEIDER,
TH. IMER.